(12) United States Patent
Mancosh et al.

(10) Patent No.: US 7,875,655 B2
(45) Date of Patent: Jan. 25, 2011

(54) CARPET WASTE COMPOSITE

(75) Inventors: Douglas Mancosh, Warwick, RI (US); James Przybylinski, Corvallis, OR (US); David E. Murdock, Dublin, OH (US)

(73) Assignee: Material Innovations, LLC, Providence, RI (US)

( * ) Notice: Subject to any disclaimer, the term of this patent is extended or adjusted under 35 U.S.C. 154(b) by 765 days.

(21) Appl. No.: 11/514,303

(22) Filed: Aug. 31, 2006

(65) Prior Publication Data

US 2007/0173551 A1  Jul. 26, 2007

Related U.S. Application Data

(63) Continuation-in-part of application No. 11/507,366, filed on Aug. 21, 2006, now abandoned.

(60) Provisional application No. 60/760,500, filed on Jan. 20, 2006.

(51) Int. Cl.
C08J 11/04 (2006.01)

(52) U.S. Cl. .................. 521/40.5; 521/47; 521/48; 521/49.8

(58) Field of Classification Search ............... 521/40.5, 521/47, 48, 49.8
See application file for complete search history.

(56) References Cited

U.S. PATENT DOCUMENTS

| | | |
|---|---|---|
| 3,936,554 A | 2/1976 | Squier |
| 3,959,434 A | 5/1976 | Squier |
| 4,028,159 A | 6/1977 | Norris |
| 4,158,646 A | 6/1979 | Benkowski et al. |
| 4,315,048 A | 2/1982 | Beghelli et al. |
| 4,382,108 A | 5/1983 | Carroll et al. |
| 4,567,987 A | 2/1986 | Lepisto et al. |
| 5,217,655 A | 6/1993 | Schmidt et al. |
| 5,294,384 A | 3/1994 | David et al. |
| 5,441,801 A | 8/1995 | Deaner et al. |
| 5,486,553 A | 1/1996 | Deaner et al. |
| 5,498,667 A | 3/1996 | David et al. |
| 5,534,590 A | 7/1996 | Horiie et al. |
| 5,535,945 A | 7/1996 | Sferrazza et al. |
| 5,539,027 A | 7/1996 | Deaner et al. |
| 5,578,370 A | 11/1996 | Ferrar et al. |
| 5,591,802 A | 1/1997 | David et al. |
| 5,626,939 A | 5/1997 | Kotlair et al. |
| 5,662,994 A | 9/1997 | Funger et al. |
| 5,695,874 A | 12/1997 | Deaner et al. |
| 5,728,741 A | 3/1998 | Zegler et al. |
| 5,738,935 A | 4/1998 | Turk et al. |
| 5,773,138 A | 6/1998 | Seethamraju et al. |
| 5,786,279 A | 7/1998 | Funger et al. |
| 5,786,280 A | 7/1998 | Funger et al. |
| 5,827,607 A | 10/1998 | Deaner et al. |
| 5,840,773 A | 11/1998 | Booij et al. |
| 5,912,315 A | 6/1999 | Horiie et al. |
| 5,932,334 A | 8/1999 | Deaner et al. |
| 5,948,524 A | 9/1999 | Seethamraju et al. |
| 5,981,067 A | 11/1999 | Seethamraju et al. |
| 6,004,668 A | 12/1999 | Deaner et al. |
| 6,007,590 A | 12/1999 | Sanders, Jr. |
| 6,015,611 A | 1/2000 | Deaner et al. |
| 6,015,612 A | 1/2000 | Deaner et al. |
| 6,015,856 A | 1/2000 | Matsushita et al. |
| 6,063,473 A | 5/2000 | Zafiroglu |
| 6,132,840 A | 10/2000 | Lee |
| 6,194,051 B1 | 2/2001 | Gagas et al. |
| 6,210,792 B1 | 4/2001 | Seethamraju et al. |
| 6,211,275 B1 | 4/2001 | Xanthos et al. |
| 6,241,168 B1 | 6/2001 | Young et al. |
| 6,265,037 B1 | 7/2001 | Godavarti et al. |
| 6,271,270 B1 | 8/2001 | Muzzy et al. |
| 6,274,637 B1 | 8/2001 | Schallenberg et al. |
| 6,305,920 B1 | 10/2001 | Kean et al. |
| 6,306,318 B1 | 10/2001 | Ricciardelli et al. |
| 6,387,967 B2 | 5/2002 | Muzzy et al. |
| 6,592,962 B2 | 7/2003 | Edwards et al. |
| 6,680,090 B2 | 1/2004 | Godavarti et al. |
| 6,682,789 B2 | 1/2004 | Godavarti et al. |
| 6,723,424 B2 | 4/2004 | Ricciardelli et al. |
| 6,749,921 B1 | 6/2004 | Edwards et al. |
| 6,756,412 B2 | 6/2004 | Muzzy |
| 6,758,996 B2 | 7/2004 | Monovoukas et al. |
| 6,786,988 B1 | 9/2004 | Bell |
| 6,814,826 B1 | 11/2004 | Bell |

(Continued)

FOREIGN PATENT DOCUMENTS

DE       24 44 420        3/1976

(Continued)

OTHER PUBLICATIONS

International Search Report for PCT/US07/60381 dated Oct. 1, 2007, 2 pp.
Anonymous: "Separation Process," Research Disclosure, Mason Publications, Hampshire, GB, vol. 388, No. 13, Aug. 1, 1996, ISSN: 0374-4353, 1 page.

*Primary Examiner*—Edward J Cain
(74) *Attorney, Agent, or Firm*—Goodwin Procter, LLP

(57) ABSTRACT

A composite material produced from carpet waste and a binding agent, in intimate association, which material includes 25% and 99% carpet waste and between 1 and 25% binding agent. A method for manufacturing the composite material is also disclosed.

48 Claims, 3 Drawing Sheets

U.S. PATENT DOCUMENTS

| | | |
|---|---|---|
| 6,821,614 B1 | 11/2004 | Dubelsten et al. |
| 6,860,953 B1 | 3/2005 | Grizzle et al. |
| 6,867,322 B1 | 3/2005 | Kato et al. |
| 6,872,674 B2 | 3/2005 | Williams et al. |
| 6,972,144 B2 | 12/2005 | Roth et al. |
| 7,022,751 B2 | 4/2006 | Zhang et al. |
| 7,045,590 B2 | 5/2006 | Bell |
| 7,169,464 B2 | 1/2007 | Semmens |
| 2001/0051243 A1 | 12/2001 | Godavarti et al. |
| 2001/0051249 A1 | 12/2001 | Gagas et al. |
| 2002/0009936 A1 | 1/2002 | North et al. |
| 2002/0031653 A1 | 3/2002 | Ricciardelli et al. |
| 2002/0031659 A1 | 3/2002 | Gansen et al. |
| 2002/0106498 A1 | 8/2002 | Deaner et al. |
| 2003/0075824 A1 | 4/2003 | Moore et al. |
| 2003/0087079 A1 | 5/2003 | Okabe et al. |
| 2003/0087572 A1 | 5/2003 | Balthes et al. |
| 2003/0087574 A1 | 5/2003 | Latimer et al. |
| 2003/0124940 A1 | 7/2003 | Michael |
| 2003/0138616 A1 | 7/2003 | Englert |
| 2003/0207634 A1 | 11/2003 | Holeschovsky |
| 2004/0058163 A1 | 3/2004 | Gansen et al. |
| 2004/0062920 A1 | 4/2004 | Guilbert et al. |
| 2004/0076820 A1 | 4/2004 | Hodgson |
| 2004/0096628 A1 | 5/2004 | Saathoff et al. |
| 2004/0101674 A1 | 5/2004 | Ross |
| 2004/0126568 A1 | 7/2004 | Deaner et al. |
| 2004/0161993 A1 | 8/2004 | Tripp et al. |
| 2004/0191617 A1 | 9/2004 | Visco et al. |
| 2004/0224589 A1 | 11/2004 | Bacon et al. |
| 2004/0241392 A1 | 12/2004 | Sorrentino |
| 2004/0247845 A1 | 12/2004 | Abe et al. |
| 2004/0259973 A1 | 12/2004 | Sakuma et al. |
| 2005/0008814 A1 | 1/2005 | Bell |
| 2005/0019539 A1 | 1/2005 | Pike |
| 2005/0042413 A1 | 2/2005 | Bell |
| 2005/0049329 A1 | 3/2005 | Faulkner |
| 2005/0132643 A1 | 6/2005 | Flanery et al. |
| 2005/0164580 A1 | 7/2005 | Holeschovsky |
| 2005/0170141 A1 | 8/2005 | Bacon et al. |
| 2005/0170157 A1 | 8/2005 | Armela et al. |
| 2005/0206029 A1 | 9/2005 | Moore et al. |
| 2005/0233126 A1 | 10/2005 | Pike |
| 2005/0287347 A1 | 12/2005 | Sorrentino |
| 2006/0006564 A1 | 1/2006 | Maldas et al. |
| 2006/0099393 A1 | 5/2006 | Woodman et al. |
| 2006/0147669 A1 | 7/2006 | Mano et al. |
| 2006/0147687 A1 | 7/2006 | Ricciardelli et al. |
| 2006/0147693 A1 | 7/2006 | Przybylinski et al. |
| 2006/0165972 A1 | 7/2006 | Chimelak et al. |
| 2006/0191655 A1 | 8/2006 | Nunn et al. |
| 2006/0229381 A1 | 10/2006 | Bartko |
| 2006/0257597 A1 | 11/2006 | Gleich |
| 2007/0007682 A1 | 1/2007 | Maldas et al. |
| 2007/0009729 A1 | 1/2007 | Kessing |
| 2007/0009743 A1 | 1/2007 | Kessing et al. |
| 2007/0043128 A1 | 2/2007 | Jenkines et al. |
| 2007/0098972 A1 | 5/2007 | Balthes |
| 2007/0113759 A1 | 5/2007 | Roth et al. |
| 2007/0173551 A1 | 7/2007 | Mancosh et al. |
| 2007/0212531 A1 | 9/2007 | McIntyre et al. |
| 2008/0075915 A1 | 3/2008 | Wening et al. |
| 2008/0098935 A1 | 5/2008 | Roth et al. |
| 2008/0102263 A1 | 5/2008 | Slywchuk et al. |
| 2008/0128933 A1 | 6/2008 | Przybylinski et al. |

FOREIGN PATENT DOCUMENTS

| | | |
|---|---|---|
| DE | 43 38 199 | 2/1995 |
| EP | 0 0688 644 | 12/1995 |
| JP | 51 062883 | 5/1976 |
| JP | 1-105096 | 4/1989 |
| JP | 2005 312782 | 11/2005 |
| SE | 504501 | 2/1997 |
| WO | WO 96/12857 | 5/1996 |
| WO | WO 01/47717 | 7/2001 |
| WO | WO 01/47718 | 7/2001 |
| WO | WO 01/48333 | 7/2001 |
| WO | WO 02/04206 | 1/2002 |
| WO | WO 02/04207 | 1/2002 |
| WO | WO 02/04208 | 1/2002 |
| WO | WO 02/47906 | 6/2002 |
| WO | WO 02/072367 | 9/2002 |
| WO | WO 02/090129 | 11/2002 |
| WO | WO 03/002338 | 1/2003 |
| WO | WO 03/047858 | 6/2003 |
| WO | WO 03/061967 | 7/2003 |
| WO | WO 03/080337 | 10/2003 |
| WO | WO-2007/084822 | 7/2007 |

CARPET WASTE COMPOSITE

CROSS-REFERENCE TO RELATED APPLICATIONS

This application is a continuation-in-part application of and claims priority to U.S. application Ser. No. 11/507,366, filed on Aug. 21, 2006, now abandoned which application claims priority to U.S. Application Ser. No. 60/760,500, filed on Jan. 20, 2006, both of which are hereby incorporated by reference.

BACKGROUND

The general field of this invention is natural and manmade fiber composites which are used in various industrial and consumer applications.

Natural and manmade fiber composites can be used in building construction, industrial applications, consumer goods, automotive products, and other industries requiring moisture or thermal resistance with various physical properties, such as low moisture absorbance and low thermal distortion. The ability to build composites of this nature, while controlling physical properties such as strength, stiffness, ductility, impact resistance, and hardness, opens a variety of application opportunities.

Additionally, there is growing pressure to re-utilize waste streams which are high in volume and low in degradability. In particular the manufacture, installation, use and (eventually) replacement of floor covering products, especially carpeting, produces a large amount of waste product. Carpet waste from new carpet production, post-consumer landfill or other used carpet applications is a several billion pound-per-year waste problem. The industry generally uses the term "selvedge" for waste material generated during the manufacturing process while other forms of manufacturing and installation waste are sometimes termed "scrap". We use the term carpet waste to cover all types of waste produced by the manufacture, installation, use and replacement of floor covering products. Often, carpet waste is not recycled, but rather is disposed of by land-filling or burning.

SUMMARY

We have discovered a composite material produced from carpet waste and a binding agent.

The first aspect of this invention is a process for converting carpet waste with or without additional fibers and/or fillers and combining it with binding agents to produce a composite material. More specifically the invention in its general form features a composite material comprising carpet waste and a binding agent in intimate association, where the composite material includes between 25% and 99% carpet waste and between 1 and 25% binding agent.

Preferably, the sum of the carpet waste and the binding agent are between 50% and 99% of the total material, and the composite material also includes from 0-50% natural fibers or manmade fiber fibers (such as oriented fiberglass), or a combination of manmade and natural fibers. The composite material may also include at least one inorganic filler such as calcium carbonate or silica. Significantly, the carpet waste includes all carpet components substantially without segregation from one another. For example, the carpet waste comprises carpet backing in an amount equal to at least 10% (by weight) of the composite material and/or it comprises carpet face polymers, such as nylon, polyester, polypropylene and wool.

Preferably the binding agent comprises one or more of: methylenediphenyl-diisocyanate (MDI), urea formaldehyde (UF), melamine urea formaldehyde (MUF), and phenol formaldehyde (PF).

Also preferably, the modulus of elasticity of the composite material is at least 55,000 PSI by ASTM test D790, more preferably at least 100,000 PSI by ASTM test D790. Preferably the modulus of rupture of the composite material is at least 600 PSI by ASTM D790, more preferably between 1000 and 2500 PSI by ASTM D790. Preferably the density of the composite material is at least 30 pounds per ft$^3$, more preferably from 40-80 pounds per ft$^3$.

In a second aspect the invention generally features a method of manufacturing a composite material comprising providing carpet waste; preparing the carpet waste by subjecting it to size-reduction treatment; combining the size-reduced carpet waste with a binder; subjecting the binder/carpet waste combination to pressure and elevated temperature in a confined geometry to produce a composite structure comprising carpet waste and a binding agent in intimate association. The material thus made preferably comprises between 25% and 99% carpet waste and between 1 and 25% binding agent. Preferably the size reduction step comprises one or more of the following processes: chopping; shredding; grinding; contaminant separating; palletizing; agglomerating; pulverizing; fine grinding; and/or fiberizing the carpet waste. (For example, the carpet waste granules are subjected to spinning and are forced under pressure through orifices sized and configured to densify the material.)

The size-reduced carpet waste and binder are combined in a drum to coat the waste with binder. The binder/carpet waste combination is subjected to heat and pressure in a continuous belted press or in a stationary press.

Optionally, a further layer is applied to a surface of the composite sheet thus manufactured, for example, the further layer is a laminated layer or a foil-transfer layer, or the further layer is a paint, a stain or a polymeric compound. The further layer may be molded or embossed to create a patterned surface on the composite material. Optionally, the further layer may be a wood veneer, a synthetic veneer, and/or a polymeric sheet. The surface of the composite material is prepared by means of mechanical or chemical methods, followed by foil or film lamination of the further layer. The further layer may include a hot-stamped layer.

The composite material thus formed maybe thermoformed into a desired shape. The further layers may be a foil or film laminate.

At least one layer of the composite material may be sanded.

The details of one or more embodiments of the invention are set forth in the accompanying drawings and the description below. Other features, objects, and advantages of the invention will be apparent from the description and drawings, and from the claims.

DETAILED DESCRIPTION

A generic composition of the carpet waste product produced by the invention follows:

| Material Description | Percent of material in composition |
| --- | --- |
| Carpet Waste | 25%-99% |
| Binding Agents | 1%-25% |
| Wood or natural fibers, Synthetic fibers, Inorganic fillers, Reinforcing fillers | 0%-50% |

Figure 1:
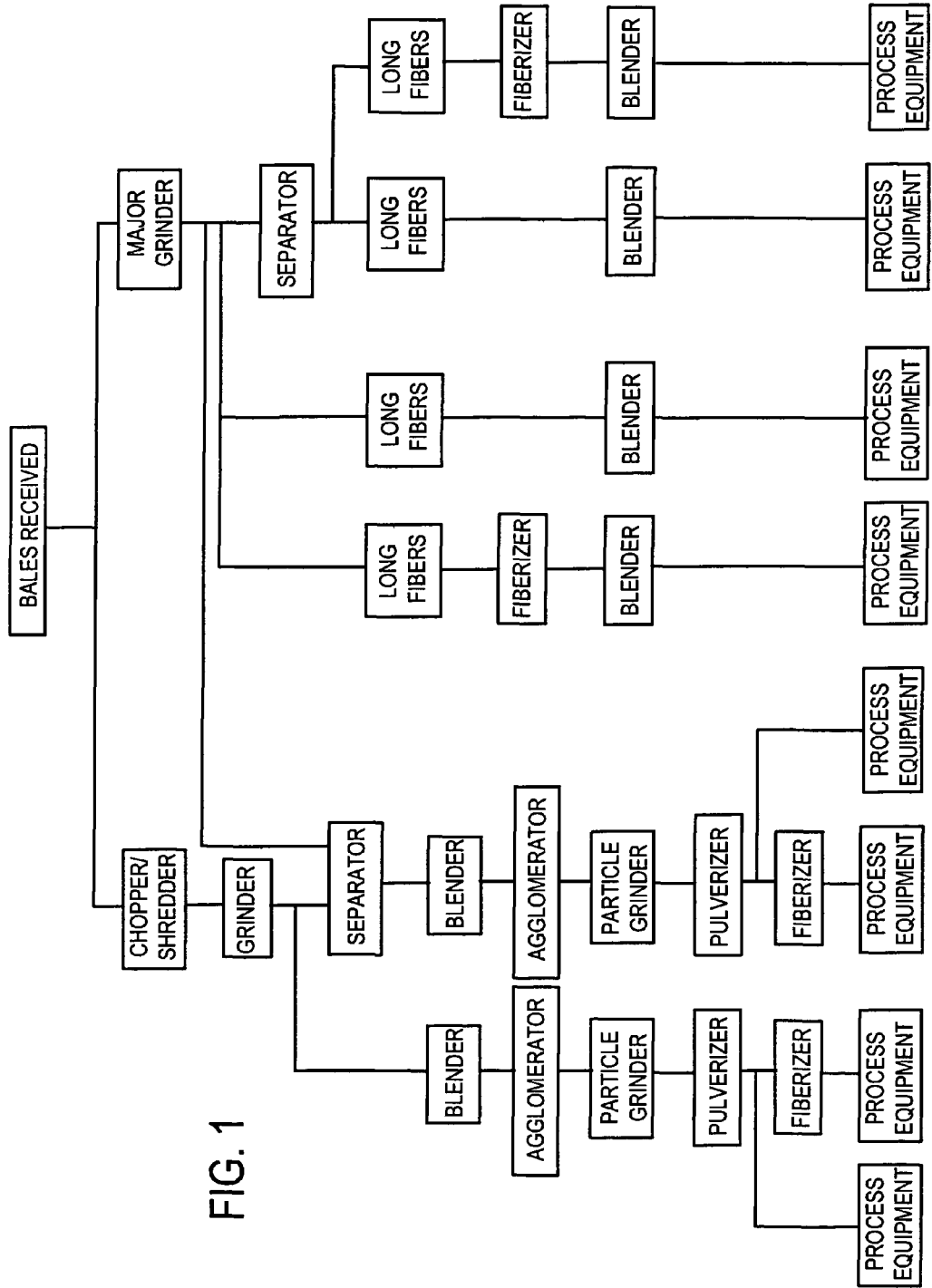
FIG. 1 is a flow chart depicting the types of size reduction equipment and the variety of size reduction procedures depending on the final carpet waste material form required for the process equipment.
Figure 2:
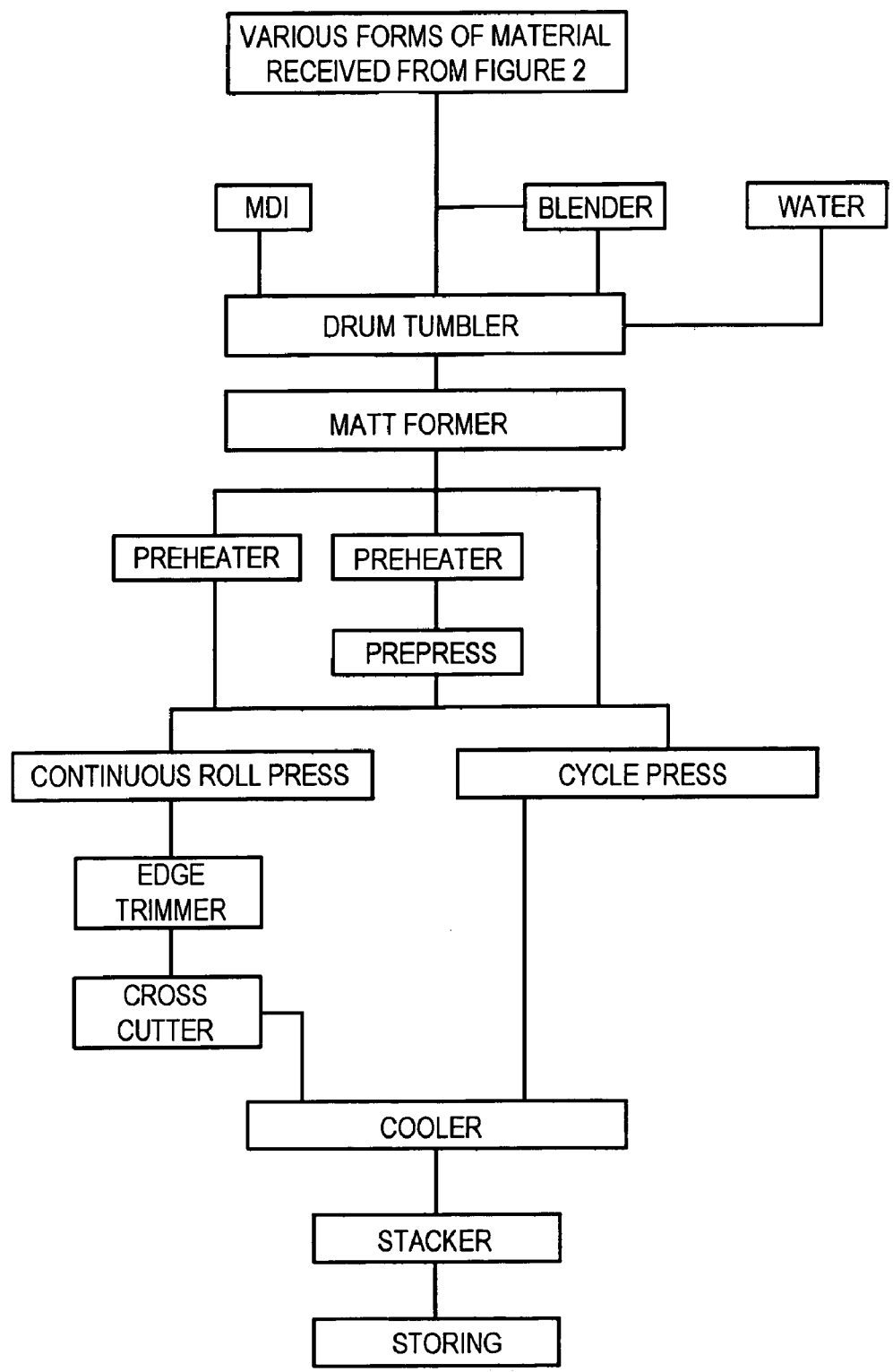
FIG. 2 depicts steps for coating the carpet waste material with the bonding agent and subsequent forming process.

There are two basic steps in the production of composite material from carpet waste. FIG. 1 shows the types of equipment and the variety of procedures depending on the final form required for the Process Equipment. The final form may also be dependent on the desired finished composite product and physical properties to be attained in the process.

First, the carpet waste is processed as described below to reduce its size. Then the size-reduced carpet waste is mixed with a binder to produce material that is subjected to temperature and/or pressure, by a panel/sheet/board process, to yield composite material.

Below we describe both steps in detail. We then describe post-manufacture treatments for the composite material.

Carpet Waste Size Reduction

The carpet waste is made up of selvedge, post-industrial carpet waste, post-consumer waste carpet, or waste carpet reclaimed from landfills. These materials will be in baled form to begin the size reduction phase of the pre-processing. The bales vary in size but usually represent about 1000 lb. to 2000 lb.

The first step is to reduce the waste to a manageable size for the rest of the process. Either a combination of a shredder/chopper and grinder, or a major capacity grinder is used to process the materials to smaller sizes. The shredder/chopper will reduce the selvedge or carpet waste to chunks approximately three inches square (3"×3"). The shredded material then passes through a grinder which further reduces the chunks a fiber fluff material with a diameter of the fibers similar to the diameter of the original carpet fibers and a length of about ¼" to 1".

The waste optionally can be run through a separator which acts as a hammer mill/cyclone to remove the dirt from the carpet waste. In this step some of the carpet backing containing inorganic fillers may also be removed. The slightly size reduced material, due to the hammer mill effect, is ready for the next step, the agglomeration process. The dirt and carpet backing materials that have been removed from the small chunks are then disposed.

The fiber fluff, regardless of the use of the separator or not, optionally can be blended with other materials such as wood or natural fibers, synthetic fibers (i.e. fiberglass), inorganic fillers, or other reinforcing fillers. The fiber fluff material or the blended material is then conveyed to the agglomeration step.

The agglomeration of the above materials occurs inside the agglomerator. The materials enter a horizontal drum containing a revolving rotor. The rotor is shaped so as to force the fiber fluff or blends against the drum wall. The drum wall is perforated so that, as the rotor forces the contained materials against the perforated wall, the material is forced through the perforations forming strands of a fixed diameter. On the outside of the drum are stationary knives which cut the strands into a fixed length. During this process the material is heated by friction to a temperature that remains below the melting point of the highest melting point material in the blend. The temperature is controlled by the speed of the rotor, the diameter of the perforations, and the thickness of the drum wall.

The granules that are formed in the agglomeration step are cylindrical in shape and approximately ⅛ inch in diameter and ⅛ to ¼ inch long. The diameter and length of the granules can be changed by changing the diameter of the holes in the drum wall and/or changing the speed of the knives rotation. Because the granules are hot when they are formed and cut to length some of the granules are stuck to one another. Therefore, for better size consistency, the granules next pass through a grinder which breaks the granules away from each other. This grinder step may also be used to reduce the size of the granules.

The granules may be further reduced in size by a pulverizer. If the final desired dimension is less than ⅛ inch the pulverizer is used to reduce the particle size to 8-16 mesh. This is the equivalent of 0.04 inch to 0.10 inch.

One last optional step may now be performed, to fiberize the granules or the pulverized particles. The fiberizing is a mechanical roughing of the surface so that the surface takes on a "fuzz" like characteristic. This can be an important final preparation for the composite product process described below in the Process Description. The material, whether granule or pulverized particle, whether fiberized or not, is now sent on to the composite production process.

An alternative method for initial size reduction is to use a major capacity grinder which reduces the carpet waste to fibers approximately ¼ inch to 1 inch in length and approximately 1/32 inch to ⅛ inch in diameter. These random sized fibers are ready for the agglomeration process or for alternative actions not requiring agglomeration.

Regardless of the process direction, the next step is to pass the material through a separator. This is the same equipment and effect as described above. As above, this is an optional step in the material preparation phase being described here. The fibers may now go through the agglomeration process in the exact same manner as described above, or the fibers may pass directly to the fiberizer equipment. Again the fiberizer acts to change the surface characteristics of the fibers giving them a "fuzz" surface with greater surface area and a different bulk density. The fiberizing step may not be required for all end uses of the composite products.

Whether the fibers have been fiberized or not they will pass through a blender where wood or natural fibers, synthetic fibers (i.e. fiberglass), inorganic fillers, or mineral fillers (if any) may be added. Once the blending of the fibers and added materials is complete, the blend is ready for the composite product Process.

The composite product composition is controlled by controlling the above steps. Significantly, it typically is not necessary to separate or classify the various materials contained in selvedge or carpet waste. Most carpet surface materials are nylons, polyester, polypropylene, or wool. The backing material is usually polypropylene and/or highly filled synthetic latex. These materials exhibit considerably different physical properties and processing properties. The entire waste product may be used regardless of the differences in the materials.

The waste carpet, having been made into an agglomerate, a fiberized agglomerate, a pulverized agglomerate, or a fiberized, pulverized agglomerate, becomes the base material for the composite product. Waste fiber or fiberized waste fiber may also be used to manufacture a composite product. The whole range of materials in carpet waste may be part of the composition.

The other major part of the composition is a binding agent, most usually MDI, methylenediphenyldiisocyanate. The MDI acts as a binding agent for the fibers or agglomerated materials to give the basis for the composite products. The ratio of the MDI to the fibers or particles is a determinant in the physical properties attained in the Process. Further, the physical properties are modified by the use of wood and natural fibers, synthetic fibers, inorganic fillers, and reinforcing fillers.

The MDI and carpet waste materials comprise at least 50% of the composition and may make up 100% of the final product. The MDI content is between 1% and 25% leaving the remainder of the material to be carpet waste and added materials. The added materials, wood and natural fibers, synthetic fibers, inorganic fillers, and reinforcing fillers, may make up to 50% of the total composition. However, the basic material is usually a 9:1 ratio of carpet waste to MDI with any added materials being around 25% of the carpet waste/MDI content.

In addition to MDI being employed as the binding agent, the binding function can be accomplished using urea formaldehyde (UF), melamine urea formaldehyde (MUF), or phenol formaldehyde (PF). The MDI is the preferred chemical for the composition because of its properties and the elimination of a formaldehyde binding agent.

In summary, the composition of carpet waste and MDI (with or without additive materials) can be used to make a wide range of composite products. The carpet waste includes all of the carpet product including all the different types of face fibers and the carpet backing.

Coating the Carpet Waste Material with the Binding Agent

The carpet waste material may have the form of granules (pellets or particles), or of the fibrous waste material or fiberized versions of the granules or fibrous material. The carpet waste materials are generally loaded into a large rotating drum or a drum with rotating mixing blades or a resination blow line. Other materials such as natural fiber fillers or inorganic fillers may be loaded with the carpet waste material. If the material is loaded into a drum, then water and/or a binding agent are sprayed out of the head inside of the drum to thoroughly coat the materials. While the drum and/or blades are spinning and causing the material held within to become evenly distributed, the spray head is releasing a fine mist of water or binding agent. This results in a thoroughly coated material. Water is usually sprayed into the drum to achieve a desired moisture content for the material and prepare the material for the binding agent. The binding agent is usually sprayed after the water to make sure that it reacts and thoroughly coats the material in the drum. For the resination blow line method, the material is blown through a tube that has water and MDI introduced into it. The blowing action cause the air to become turbulent which allows the water and MDI to evenly coat the material. The binding agent, specifically MDI, is applied in this manner to the granules or fibers at a concentration of 1% to 25% of the total weight of the granules plus any other additives. (Throughout the description, the terms granules or fibers can include additives in addition to the carpet waste.) The MDI adheres to the granules and fibers, giving each granule or fiber an MDI surface coating. The MDI dries rapidly under ambient conditions, allowing the granules or fibers to continue to flow without adhering to one another. The granules or fibers with the MDI coating then pass on to the next step in the process which is the preparation of the carpet waste composite material for the Board Preparing for the Board Forming Process The MDI coated composite material is conveyed to the Mat Forming Station which includes conveyors, metering scales, spreader heads and a control management system. The mat forming station employs spreading equipment to distribute the composite material onto a forming belt so that the spread material becomes a mat which has a uniform thickness, width and density. Board properties are mainly determined by the shape of the carpet waste composite particles/fibers and by their position in the formed mat. For this reason the spreading equipment is finely tuned to produce the proper shape and size of the mat. The Forming station can distribute more than one type of material for a multi-layered board. For example, the spreader head in the forming station could spread a mat of fibers on the forming belt, then a second spreader head could spread a mat of pellets on top of the fibers, then a third spread head could spread a top layer of fibers onto the pellets. Many different combinations of materials can be spread onto the forming belt to make various types of boards. The number of layers per board can be varied also. For example, a board could be manufactured to have CW fiber skins and a fiberglass core or a board could be manufactured to have CW pellet skins, CW fiber underlayers and a CW pellet core. After the mat is spread formed, the forming belt then transports the mat into the pre-heater or directly into a Pre-Press. The pre-heater continuously transfers the mat and subjects the composite material to microwaves or injects hot air and/or steam into the mat before it enters the Board Forming process. The temperature of the mat is elevated from about 65° F. to about 200° F. before entering the board forming process. This rapid heat transfer to the carpet waste is accomplished by microwaves or by the injection of a steam/air mix (moist air) alternately from either surface into the mat. The steam condenses during this process, transferring the heat into the mat. The pre-heater may also pre-press or compress the material before it enters the board forming process. The heated mat is then transferred by an intermediate belt conveyor to the compression section of the infeed end of a continuous roll press or into a cycle press which is the beginning of the board-forming process.

If a cycle or stationary press is used instead of a continuous roll press, then pre-heating of the mat is usually skipped and steam injection may be used during the sheeting process in the cycle press or the steam injection can be skipped.

The Board Forming Process employs a Cycle Press or Continuous Roll Press. Both types of equipment use pressure and temperature to form a board, panel or sheet from the Carpet Waste Composite Material that is coated with MDI.

The Cycle press may have single or multi-daylight openings. The composite material is transferred into the cycle press where it is subjected to temperature and pressure from a top and bottom platen that condenses the mat to a determined height and allows the MDI reaction to take place bonding the mat together to form a Board. The mat may have steam injected through it while in the cycle press to ensure a thorough heating and bonding of the composite material. The platens may have a pattern engraved into them to give the boards surface a structured pattern. The Cycle press may also use a cooling cycle to reduce the temperature of the board before it exits the press.

Carpet waste composite boards have been manufactured using a cycle press. The operating conditions and settings are shown in Chart 1 attached hereto.

The continuous roll press is a double belted press capable of maintaining a range of temperatures and pressures on the mat to allow the MDI reaction to take place, binding the mat together. The preferred type of belt for the continuous roll press is made of steel but other materials may be used. The press has the capability of reaching temperatures of 65° F. to 550° F. to allow the heat to transfer throughout the mat. Similarly, varying pressures are used to squeeze the granule layer or the fiber mat to the desired thickness and density of the final product.

The continuous roll press consists of a press structure which takes up the horizontal forces resulting from the belt tensioning. There are many frame units whose number depends on the length of the press and pressure that is needed. Cylinders are used for the exertion of pressure arranged at the frame units in various combinations, a certain number of which are suitable for opening the press. There are top and bottom heated platens which the roller rods and belts travel over. The press has an infeed head to guide the roller rods, belts and mat to be pressed. The roller rods are located between the heated platens and the belts. The mat is located between the two belts. Two drums are located at each end of the press for the belts to travel around. Drum scrapers are used to keep the mat between the belts. A release agent may be sprayed onto the belts to keep the mat from sticking to the belts and exit the press. A control system regulates the operation of the press such as the speed of the belts, temperature, pressure, thickness of the mat, etc.

The continuous roll press transfers heat to the MDI-coated composite material. The heat activates the MDI coating on the materials which are then pressed to a lesser thickness by the continuously moving belts. As the material moves between the belts through the infeed section, the thickness dimension is reduced as well as continually heated. The temperature of the MDI-coated granules or the MDI-coated fibers is maintained above the activation temperature of the MDI. Under the pressure of the platens which are set at a predetermined height, the granules or fibers adhere to each other forming a continuous sheet product. This final thickness determines the density of the material as well. The density is determined by the initial thickness of the un-bonded mat entering the continuous press and the final thickness as the newly formed composite product exiting the press.

The Board Finishing Process

After the binding of the material and desired height dimension of the mat has been reached in a continuous roll press, a Board is formed which is in the shape of a continuous ribbon. When the ribbon exits the press it undergoes a continuous edge trimming operation to reach the desired width and then it is cross-cut to a pre-selected length. The ribbon is transported through the trimming and cross-cutting operations by a roller conveyor and pinch rollers. The board that has been cut to a predetermined width and length is then transported to a cooling station. The cooling station can employ a variety of different machines such as a Star Cooler with subsequent stacking or a stacking roller conveyor. One of the most common types is the star cooler with subsequent stacking. The Star Cooler is a large diameter wheel with multiple rows of spoked arms extending from the wheel. The arms lift each Board from the conveyor and allow the Boards to rotate with the wheel and be air cooled. If needed, the continuous roll press can have a cooling section near the exit. This will cool the board before it exits the press eliminating the need for further cooling. The Board is then conveyed to a stacking operation and stored for future use. The Boards are now ready to be shipped or they can go through a variety of decorating alternatives.

In a cycle press, the board can be manufactured to finished size or slightly oversized. If it is oversized, then it is cut to finish dimensions after it exits the press. The Platens in the cycle press can have a patterned surface to give the board a structured surface such as a wood grain pattern.

Decorating the Composite Product

Figure 3:
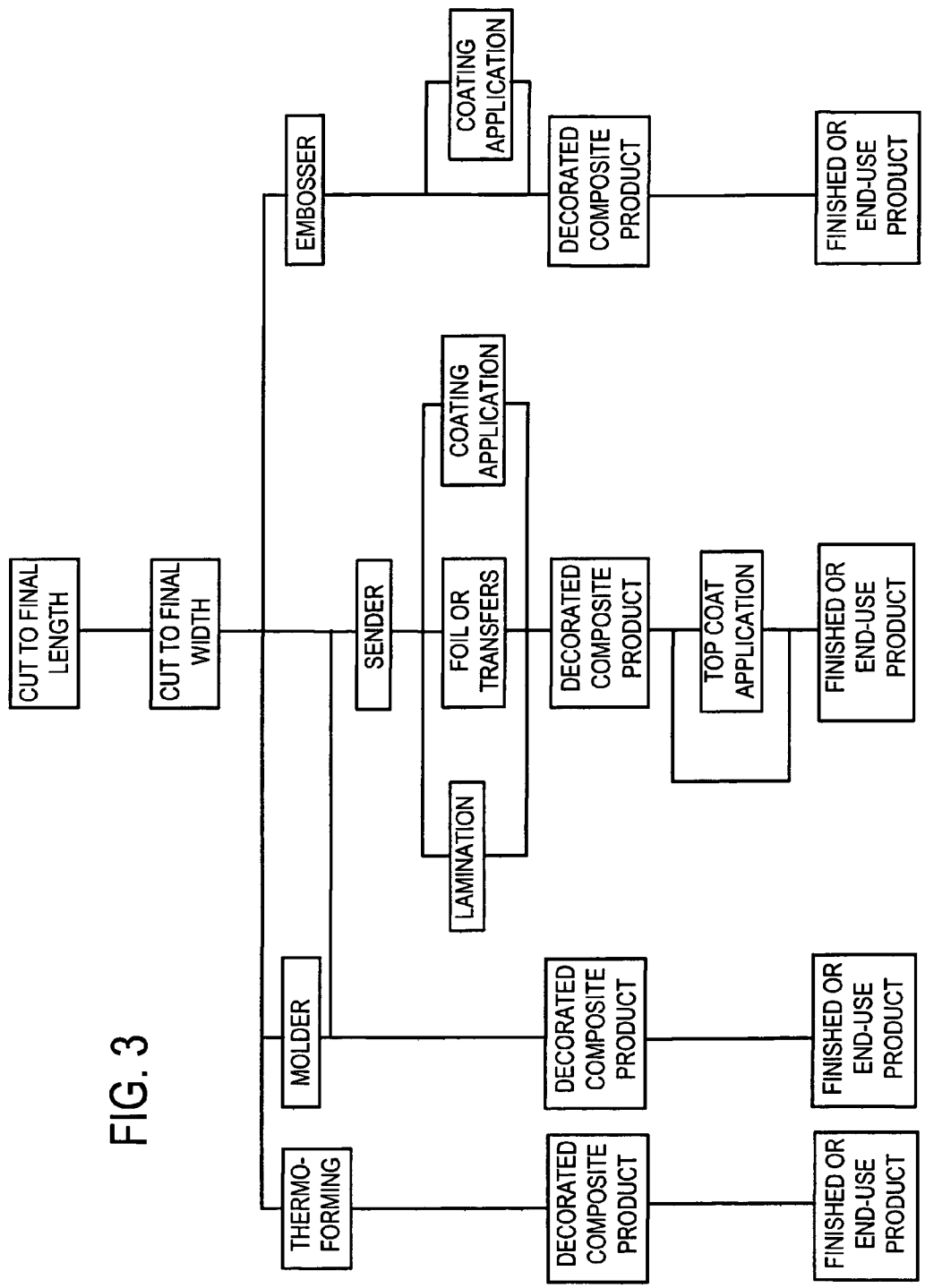
FIG. 3 depicts steps for finishing the composite board product.

As the composite product exits the Process as described above, it may be of varying thicknesses from less than ⅛ inch up to 2 inches. Since the last step in the Process is the cutting to length of the composite product, the first step in finishing the product is cutting to final width. FIG. 3 shows the finishing and decorating steps that may be employed following cutting to final width.

The composite product can now be molded to change the profile to take on the shape required in the finished product. The molding is done on a cutting machine of different designs. The most common of which is the rotating knives device. This machine allows for the setting of the knife blades to adjust the cut to the desired profile. Another common device is the router which cuts a specific groove or grooves (routs) into the surface of the composite product The router has the same effect as the molder in that it changes the initial profile out of the Process into the desired profile required for the final product.

The profile may also be changed using thermoforming methods. In this case the composite product is placed in a mold of the desired profile and with heat and pressure the product takes on the shape of the mold. This profile change offers an additional decorating capability in that the desired color and/or pattern may be on a transfer foil placed in the mold. With the application of the heat and pressure during the process, the color and/or pattern are transferred from the carrier foil to the composite product. Thus at the end of the thermoforming process, the composite product has the desired profile and also the desired decoration.

The composite product may be embossed after the Process. The embossing is accomplished with an embossing plate or roll. The plate or roll has the pattern to be transferred to the product on the surface of the plate or roll. This surface is heated to a temperature that will soften the surface of the composite product. Then the plate or roll is pressed on to the surface of the product to give the desired pattern transfer. As the surface of the composite product cools, the embossed pattern becomes fixed on the surface of the composite product. The embossed composite product is now ready to be coated; or if no coating is required for the end-use product, it is ready for packaging.

All composite products that will be decorated pass through the sander (the equipment described above). This smoothing of the surface prepares the product for coating, transfers, and laminating.

The sanded or embossed composite product may be coated with primers, finish paints, or stains. The application of the coatings employs the various, conventional spray techniques using exhaust systems to remove the excess spray and solvents. Either penetrating or film-forming coatings are applicable, and the choice is dependent on the desired finished product appearance and application.

The sanded composite product can also act as a core to which decorative and protective layer(s) may be hot stamped from a foil or film or laminated, to achieve the improved physical and visual enhancement over the current inventions.

The following relevant patent applications are incorporated by reference in its entirety. U.S. Ser. No. 11/054,258, filed Feb. 9, 2005 and U.S. Ser. No. 60/641,308, filed Jan. 4, 2005.

The composite product may be decorated using transfer foils. Once again the product requires sanding to smooth the surface. An adhesive layer is applied to the profile using a conventional application technique. The transfer foil has the desired color and/or pattern on a polymeric substrate. The foil is brought into contact with the surface of the product using stamping equipment designed for the specific application. Using heat and pressure the color and/or pattern are transferred from the foil to the product. The heat required for the transfer activates an adhesive layer on the surface of the profile ensuring bonding of the decoration to the profile. With the color and/or pattern now on the composite product, the spent foil is then collected for disposal; and the finished product has the desired decorated effect.

Another decorating method which may be employed is lamination. Several materials may be used as the laminate surface, such as, wood veneers, synthetic veneers, foils, films, and polymeric sheets.

The application of rigid laminates like wood veneers is done using conventional laminating equipment. Generally, an adhesive system (either a wet adhesive system or a hot-melt adhesive system) employing a primer and an adhesive is applied to the substrate. The rigid surface laminate is then laid on to the substrate and temperature and pressure are applied. After the temperature-pressure step the laminated product is then set for a fixed period of time to allow the adhesive system to cure. In the case of the composite product, the composite product is the substrate. The adhesive system, usually a hot-melt adhesive, is applied to the composite product. The rigid veneer is the placed on the adhesive layer forming a sandwich of composite product, adhesive, and rigid laminate. The sandwich is then pressed to secure the bond of the laminate to the composite product. After curing the laminated product with the desired decorative appearance is ready for packing.

Another laminating technique used with the composite product is foil laminating. This technique can be referred to as wrapping wherein the composite product profile is wrapped in the decorative foil. After the composite product profile has been sanded the profile passes through a wrapping device. This device takes the foil wrap from a coil then applies the adhesive (and primer, if required) to the foil. In a continuous process the foil wrap is then passed over the composite product profile. Using a series of rollers, the foil wrap is shaped to the composite product profile. The foil wrap may incorporate in addition to its decorative elements an integral topcoat material for physical property enhancement. This integrated element may be polyurethane, acrylic, or other protective materials. If, however, the foil wrap integrates only the decorative elements, then the wrapped composite product will require a topcoat for certain applications.

If the end-use product application requires significant surface property enhancements, such as abrasion resistance, a topcoat may be added to the decorating process. The topcoat can be polyurethane, acrylic, or other protective material that will impart better physical properties to the surface of the wrapped finished product. The topcoat may be spray applied or hot melt applied. If spray applied, the wrapped composite product will pass through a spray applicator and then may or may not pass through a curing device such as ultra-violet radiation. If the topcoat is hot melt applied, then a layer of polyurethane is applied to flat surfaces of the decorated composite product. The cure process for this type of material is time dependent and could take several days depending on the hot melt topcoat chosen for a specific end-use application for the completed finished product.

A number of embodiments of the invention have been described. Nevertheless, it will be understood that various modifications may be made without departing from the spirit and scope of the invention. Accordingly, other embodiments are within the scope of the following claims.

CHART 1

| Material - CW Fibers & Agglomerated Pellets | Weigh-in [oz] | MDI Resin/content (2%-10%) | Humidity [%] | Target Density [pcf] | Designation of Presscycle | specific Pressure [psi] (limit) | Cure Time relative to Thickness of Board [seconds per Millimeter] |
|---|---|---|---|---|---|---|---|
| Fibers | 116.4 | 10% | 3 | 70 | m1239a20.20s | 580.125848 | 19 |
| Fibers | 116.4 | 5% | 3 | 70 | m1239a20.20s | 580.125848 | 19 |
| Fibers | 116.4 | 2% | 3 | 70 | m1239a20.20s | 580.125848 | 19 |
| Pellets/Fibers | 123.4 | 10% | 5.2/2.94 | 70 | m1239a20.20s | 580.125848 | 19 |
| CW 1 F | 49.7 | M 20 R | 2.77 | 55 | m0838a19.19s | 580.125848 | 19 |
| Fibers | 51.1 | 5% | 2.9 | 55 | m0838a19.19s | 580.125848 | 19 |
| Fibers | 65.6 | 2% | 2.9 | 65 | m0838a19.19s | 580.125848 | 19 |
| Fibers/Pellets | 91.0 | M 20 R | 2.72/3.95 | 55 | m1238a20.20s | 580.125848 | 19 |
| " | 114.6 | 10% | " | 68 | m1238a20.20s | 580.125848 | 19 |
| " | 107.6 | 10% | " | 68 | m1238a20.20k | 580.125848 | 19 |
| " | 215.1 | 10% | " | 68 | m2538a19.19s | 580.125848 | 19 |
| " | 215.1 | 10% | " | 68 | m2538a19.19s | 580.125848 | 19 |
| Pellets | 102.3 | 10% | 5.3 | 70 | m1239a20.20t | 290.062924 | 19 |
| Pellets | 74.1 | 7% | 5.3 | 50 | m1239a20.20t | 290.062924 | 19 |
| Pellets | 104.0 | 5% | 5.34 | 70 | m1239a20.20t | 290.062924 | 19 |
| Pellets | 72.3 | 2% | 5.63 | 50 | m1239a20.20t | 290.062924 | 19 |

| Material - CW Fibers & Agglomerated Pellets | Temperature of Heating Plates [Degrees Fahrenheit] | 'Offset' = a distance added to the presscycle mainly used to adapt to the structure bleach (mm) | Thickness of Board [inch] | Density of Board [pcf] | Remarks |
|---|---|---|---|---|---|
| Fibers | 392 | 10 | 0.500 | 66.2 | Rough Woodstructure Pattern |
| Fibers | 392 | 8 | 0.492 | 69.9 | Rough Woodstructure Pattern |
| Fibers | 392 | 8.5 | 0.504 | 68.0 | Rough Woodstructure Pattern |
| Pellets/ | 392 | 6 | 0.476 | 78.0 | 3-Layer-Board Total Weights: Surface |

CHART 1-continued

| | | | | | Layer = 40% Pellets, Core Layer = 60% Fibers |
|---|---|---|---|---|---|
| Fibers | | | | | |
| CW 1 F | 392 | 11.5 | 0.287 | 54.1 | Area being Pressed (German abbr.: Pr. Fl.): 300 mm * 300 mm |
| Fibers | 392 | 5.7 | 0.285 | 55.2 | 'Fine' (Wood) Structure |
| Fibers | 392 | 5.7 | 0.291 | 71.2 | 'Fine' (Wood) Structure |
| Fibers/Pellets | 392 | 3.0 | 0.491 | 58.6 | 3-Layer-Board Total Weights: Surface Layer = 40% Fibers, Core Layer = 60% Pellets |
| " | 392 | 3.0 | 0.489 | 75.2 | 3-Layer-Board Total Weights: Surface Layer = 40% Fibers, Core Layer = 60% Pellets |
| " | 392 | 3.2 | 0.520 | 66.0 | Cool down cycle within Press used for remainder |
| " | 392 | 3.2 | 0.998 | 68.2 | SL = 40% Fibers, CL = 60% Pellets (of total weight) |
| " | 392 | 3.2 | 1.020 | 67.7 | SL = 9% Fibers, CL = 91% Pellets (of total weight) |
| Pellets | 392 | 6 | 0.496 | 68.7 | Smooth Surface |
| Pellets | 392 | 6 | 0.500 | 51.3 | Smooth Surface |
| Pellets | 392 | 6 | 0.496 | 69.9 | Smooth Surface |
| Pellets | 392 | 6 | 0.500 | 50.1 | Smooth Surface |

What is claimed is:

1. A composite material comprising:
    carpet waste comprising a combination of nylon fibers, polyester fibers, and polypropylene fibers exhibiting different physical and processing properties; and
    a binding agent in intimate association, the composite material comprising between 25% and 99% carpet waste and between 1% and 25% binding agent,
    wherein (i) the binding agent comprises one or more of methylenediphenyldiisocyanate (MDI), urea formaldehyde (UF), melamine urea formaldehyde (MUF), and phenol formaldehyde (PF), and (ii) the composite material comprises fibers consisting essentially of a highest melting point fiber of the carpet waste.

2. The composite material of claim 1 wherein the sum of the carpet waste and the binding agent are between 50% and 99% of the total material.

3. The composite material of claim 1 wherein the material comprises from 0-50% natural fibers.

4. The composite material of claim 1 wherein the material comprises from 0-50% man made fiber fibers.

5. The composite material of claim 1 further comprising oriented fiberglass.

6. The composite material of claim 1 further comprising at least one inorganic filler.

7. The composite material of claim 6 wherein the inorganic filler comprises calcium carbonate, silica or both.

8. The composite material of claim 1, wherein the carpet waste includes all polymeric carpet components substantially without segregation from one another.

9. The composite material of claim 8, wherein the carpet waste comprises carpet backing in an amount equal to at least 10% of the composite material, by weight.

10. The composite material of claim 1, wherein the carpet waste comprises at least two different carpet face polymers.

11. The composite material of claim 10, wherein the carpet face polymers include one or more of: nylon, polyester, polypropylene and wool.

12. The composite material of claim 1 in which the binding agent is MDI.

13. The composite material of claim 1, wherein the material has a modulus of elasticity of at least 55000 PSI by ASTM test D790.

14. The composite material of claim 1, wherein the material has a modulus of elasticity of at least 100,000 PSI by ASTM test D790.

15. The composite material of claim 1, wherein the material has a modulus of rupture of at least 600 PSI by ASTM D790.

16. The composite material of claim 1 or claim 13, wherein the material has a modulus of rupture of between 1000 and 2500 PSI by ASTM D790.

17. The composite material of claim 1, wherein a density of the composite material is at least 30 pounds per ft$^3$.

18. The composite material of claim 17, wherein a density of the composite material is from 40-80 pounds per ft$^3$.

19. A method of manufacturing a composite material comprising:
    a) providing carpet waste comprising a combination of nylon fibers, polyester fibers, and polypropylene fibers exhibiting different physical and processing properties;
    b) preparing the carpet waste by subjecting the carpet waste to size-reduction treatment;
    c) combining the size-reduced carpet waste with a binding agent comprising one or more of: methylenediphenyldiisocyanate (MDI), urea formaldehyde (UF), melamine urea formaldehyde (MUF), and phenol formaldehyde (PF); and
    d) subjecting the carpet waste and binding agent combination to pressure and elevated temperature in a confined geometry to produce a composite material comprising carpet waste and binding agent in intimate association, the composite material comprising between 25% and 99% carpet waste and between 1% and 25% binding agent,
    wherein the composite material comprises fibers consisting essentially of a highest melting point fiber of the carpet waste.

20. The method of claim 19 in which step b) comprises one or more of: chopping; shredding; grinding; contaminant separating; pelletizing; agglomerating; pulverizing; fine grinding and fiberizing the carpet waste.

21. The method of claim 19 in which the size-reduced carpet waste comprises granules that are subjected to spinning and are forced under pressure through orifices sized and configured to densify the size-reduced carpet waste.

22. The method of claim 19 in which the carpet waste and binding agent are combined in a drum to coat the carpet waste with binding agent.

23. The method of claim 19 wherein the binding agent is MDI and the carpet waste and MDI are combined in a drum.

24. The method of claim 19 in which the carpet waste and binding agent combination is subjected to heat and pressure in a continuous belted press or in a stationary press.

25. The method of claim 19 further comprising applying a layer to a surface of the composite material.

26. The composite material of claim 1 further comprising a layer on a surface of the composite material.

27. The method of claim 25 or the composite material of claim 26 in which the layer is a laminated layer or a foil-transfer layer.

28. The method of claim 25 or the composite material of claim 27 in which the layer is a paint, a stain or a polymeric compound.

29. A method of manufacturing a composite material comprising:
   a) providing carpet waste;
   b) preparing the carpet waste by subjecting the carpet waste to size-reduction treatment;
   c) combining the size-reduced carpet waste with a binding agent comprising one or more of: methylenediphenyldiisocyanate (MDI), urea formaldehyde (UF), melamine urea formaldehyde (MUF), and phenol formaldehyde (PF);
   d) subjecting the carpet waste and binding agent combination to pressure and elevated temperature in a confined geometry to produce a composite material comprising carpet waste and binding agent in intimate association, the composite material comprising between 25% and 99% carpet waste and between 1% and 25% binding agent; and
   e) applying a layer to a surface of the composite material, wherein the layer is molded or embossed to create a patterned surface on the composite material.

30. The method of claim 25 or the composite material of claim 27 in which the layer is a wood veneer, a synthetic veneer, or a polymeric sheet.

31. A method of manufacturing a composite material comprising:
   a) providing carpet waste;
   b) preparing the carpet waste by subjecting the carpet waste to size-reduction treatment;
   c) combining the size-reduced carpet waste with a binding agent comprising one or more of: methylenediphenyldiisocyanate (MDI), urea formaldehyde (UF), melamine urea formaldehyde (MUF), and phenol formaldehyde (PF);
   d) subjecting the carpet waste and binding agent combination to pressure and elevated temperature in a confined geometry to produce a composite material comprising carpet waste and binding agent in intimate association, the composite material comprising between 25% and 99% carpet waste and between 1% and 25% binding agent; and
   e) applying a layer to a surface of the composite material, wherein the layer comprises a foil or film laminate.

32. A method of manufacturing a composite material comprising:
   a) providing carpet waste;
   b) preparing the carpet waste by subjecting the carpet waste to size-reduction treatment;
   c) combining the size-reduced carpet waste with a binding agent comprising one or more of: methylenediphenyldiisocyanate (MDI), urea formaldehyde (UF), melamine urea formaldehyde (MUF), and phenol formaldehyde (PF);
   d) subjecting the carpet waste and binding agent combination to pressure and elevated temperature in a confined geometry to produce a composite material comprising carpet waste and binding agent in intimate association, the composite material comprising between 25% and 99% carpet waste and between 1% and 25% binding agent;
   e) preparing the surface of the composite material and subjecting the surface of the composite material to mechanical or chemical preparation; and
   f) applying a layer to a surface of the composite material, wherein the layer comprises a foil or film laminate.

33. A method of manufacturing a composite material comprising:
   a) providing carpet waste;
   b) preparing the carpet waste by subjecting the carpet waste to size-reduction treatment;
   c) combining the size-reduced carpet waste with a binding agent comprising one or more of: methylenediphenyldiisocyanate (MDI), urea formaldehyde (UF), melamine urea formaldehyde (MUF), and phenol formaldehyde (PF);
   d) subjecting the carpet waste and binding agent combination to pressure and elevated temperature in a confined geometry to produce a composite material comprising carpet waste and binding agent in intimate association, the composite material comprising between 25% and 99% carpet waste and between 1% and 25% binding agent; and
   e) applying a layer to a surface of the composite material, wherein the layer comprises a hot-stamped layer.

34. The method of claim 25 or the composite material of claim 27 in which the composite material is thermoformed into a desired shape.

35. A method of manufacturing a composite material comprising:
   a) providing carpet waste;
   b) preparing the carpet waste by subjecting the carpet waste to size-reduction treatment;
   c) combining the size-reduced carpet waste with a binding agent comprising one or more of: methylenediphenyldiisocyanate (MDI), urea formaldehyde (UF), melamine urea formaldehyde (MUF), and phenol formaldehyde (PF);
   d) subjecting the carpet waste and binding agent combination to pressure and elevated temperature in a confined geometry to produce a composite material comprising carpet waste and binding agent in intimate association, the composite material comprising between 25% and 99% carpet waste and between 1% and 25% binding agent; and
   e) applying a layer to a surface of the composite material, wherein at least one of the layer and the surface is sanded.

36. A method of manufacturing a composite material comprising:
   a) providing carpet waste;
   b) preparing the carpet waste by subjecting the carpet waste to size-reduction treatment comprising one or more of: chopping; shredding; grinding; contaminant separating; pelletizing; agglomerating; pulverizing; fine grinding; and fiberizing; and spinning and forcing the carpet waste under pressure through orifices sized and configured to densify the size-reduced carpet waste;

c) combining the size-reduced carpet waste with a binding agent comprising one or more of: methylenediphenyldiisocyanate (MDI), urea formaldehyde (UF), melamine urea formaldehyde (MUF), and phenol formaldehyde (PF); and d) subjecting the carpet waste and binding agent combination to pressure and elevated temperature in a confined geometry to produce a composite material comprising carpet waste and binding agent in intimate association, the composite material comprising between 25% and 99% carpet waste and between 1% and 25% binding agent.

37. A composite material comprising:
carpet waste comprising a combination of nylon fibers, polyester fibers, and polypropylene fibers exhibiting different physical and processing properties;
a binding agent in intimate association with the carpet waste, wherein the binding agent comprises one or more of methylenediphenyldiisocyanate (MDI), urea formaldehyde (UF), melamine urea formaldehyde (MUF), and phenol formaldehyde (PF); and
a layer on a surface of the composite material,
wherein (i) the layer is molded or embossed to create a patterned surface on the composite material, (ii) the composite material comprises between 25% and 99% carpet waste and between 1% and 25% binding agent, and (iii) the composite material comprises fibers consisting essentially of a highest melting point fiber of the carpet waste.

38. The composite material of claim 37, wherein the layer comprises a laminate layer discrete from the carpet waste and the binding agent.

39. A composite material comprising:
carpet waste comprising a combination of nylon fibers, polyester fibers, and polypropylene fibers exhibiting different physical and processing properties;
a binding agent in intimate association with the carpet waste, wherein the binding agent comprises one or more of methylenediphenyldiisocyanate (MDI), urea formaldehyde (UF), melamine urea formaldehyde (MUF), and phenol formaldehyde (PF); and
a layer on a surface of the composite material,
wherein (i) the layer comprises a foil or film laminate, (ii) the composite material comprises between 25% and 99% carpet waste and between 1% and 25% binding agent, and (iii) the composite material comprises fibers consisting essentially of a highest melting point fiber of the carpet waste.

40. A composite material comprising:
carpet waste comprising a combination of nylon fibers, polyester fibers, and polypropylene fibers exhibiting different physical and processing properties;
a binding agent in intimate association with the carpet waste, wherein the binding agent comprises one or more of methylenediphenyldiisocyanate (MDI), urea formaldehyde (UF), melamine urea formaldehyde (MUF), and phenol formaldehyde (PF); and
a layer on a surface of the composite material,
wherein (i) the layer comprises a hot-stamped layer, (ii) the composite material comprises between 25% and 99% carpet waste and between 1% and 25% binding agent, and (iii) the composite material comprises fibers consisting essentially of a highest melting point fiber of the carpet waste.

41. The composite material of claim 40, wherein the layer comprises a laminate layer discrete from the carpet waste and the binding agent.

42. A composite material comprising:
carpet waste comprising a combination of nylon fibers, polyester fibers, and polypropylene fibers exhibiting different physical and processing properties;
a binding agent in intimate association with the carpet waste, wherein the binding agent comprises one or more of methylenediphenyldiisocyanate (MDI), urea formaldehyde (UF), melamine urea formaldehyde (MUF), and phenol formaldehyde (PF); and
a layer on a surface of the composite material,
wherein (i) at least one of the layer and the surface is sanded, (ii) the composite material comprises between 25% and 99% carpet waste and between 1% and 25% binding agent, and (iii) the composite material comprises fibers consisting essentially of a highest melting point fiber of the carpet waste.

43. The method of claim 29, wherein the applying step comprises pressing at least one of a plate or a roll onto the composite material to form the patterned surface on the composite material.

44. The method of claim 33, wherein the applying step comprises hot-stamping the surface of the composite material.

45. The method of claim 25, wherein the applying step comprises embossing a surface of the composite material.

46. The method of claim 26, wherein the layer is discrete from the carpet waste and binding agent.

47. The method of claim 19, further comprising cooling the composite material.

48. The composite material of claim 1, wherein the composite material comprises between 0% to about 50% inorganic filler.

* * * * *